United States Patent [19]

Barnidge et al.

[11] 4,048,960
[45] Sept. 20, 1977

[54] SLOTTED SURFACE FLOORING FOR USE IN ANIMAL HUSBANDRY

[75] Inventors: Thomas O. Barnidge, Sunset Hills; Russell D. Hasty, Maryland Heights, both of Mo.

[73] Assignee: Danforth Agri-Resources, St. Louis, Mo.

[21] Appl. No.: 683,323

[22] Filed: May 5, 1976

[51] Int. Cl.² .................... A01K 1/00; F04C 1/30
[52] U.S. Cl. ................................. 119/28; 52/588
[58] Field of Search ............... 119/16, 20, 28; 52/588

[56] References Cited

U.S. PATENT DOCUMENTS

| 3,043,407 | 7/1962 | Marryatt | 52/588 |
|---|---|---|---|
| 3,269,072 | 8/1966 | Black | 52/588 X |
| 3,555,762 | 1/1971 | Costanzo, Jr. | 52/588 |

Primary Examiner—Hugh R. Chamblee
Attorney, Agent, or Firm—Hill, Gross, Simpson, Van Santen, Steadman, Chiara & Simpson

[57] ABSTRACT

A floor for use in animal husbandry is provided consisting of a number of elongated extruded aluminum floor lengths each of which has a slotted top surface with longitudinally and transversely spaced apart slots, each length having a multiplicity of integral vertical support beams extending from the undersurface of the slotted surface and terminating in footed ends, one longitudinally extending side of the slotted surface having an arcuate male connector configuration and the other longitudinally extending side having a correspondingly dimensioned female connector configuration whereby adjacent lengths are pivotably connectable to one another.

3 Claims, 3 Drawing Figures

U.S. Patent  Sept. 20, 1977  4,048,960
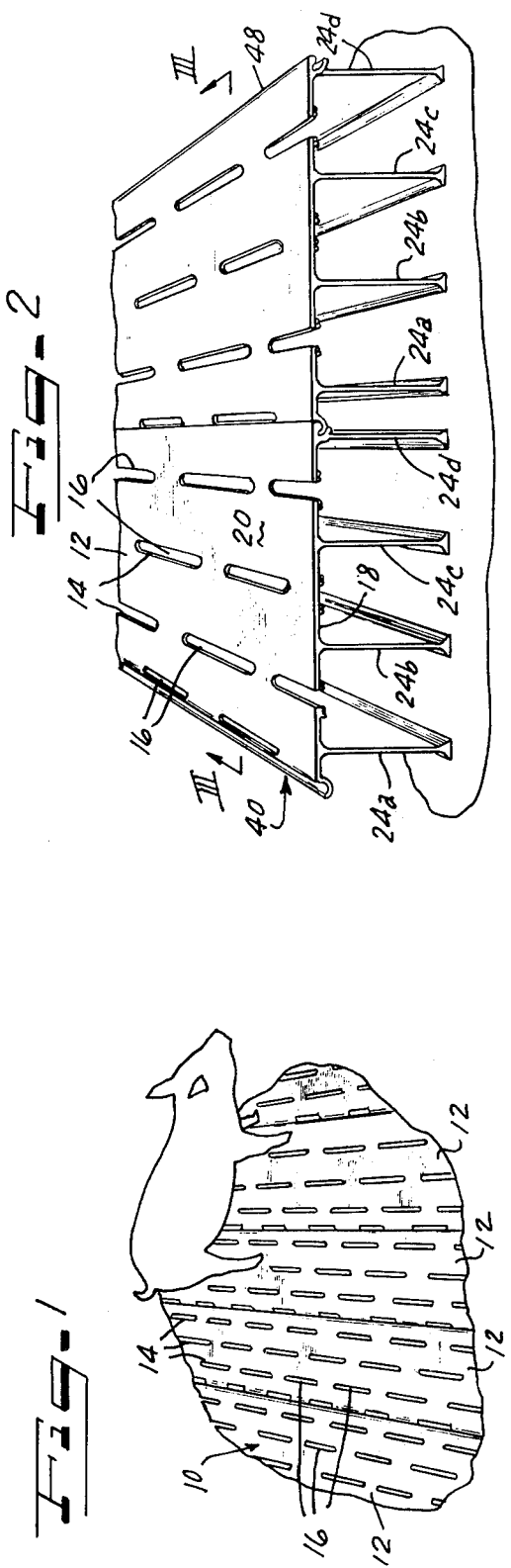
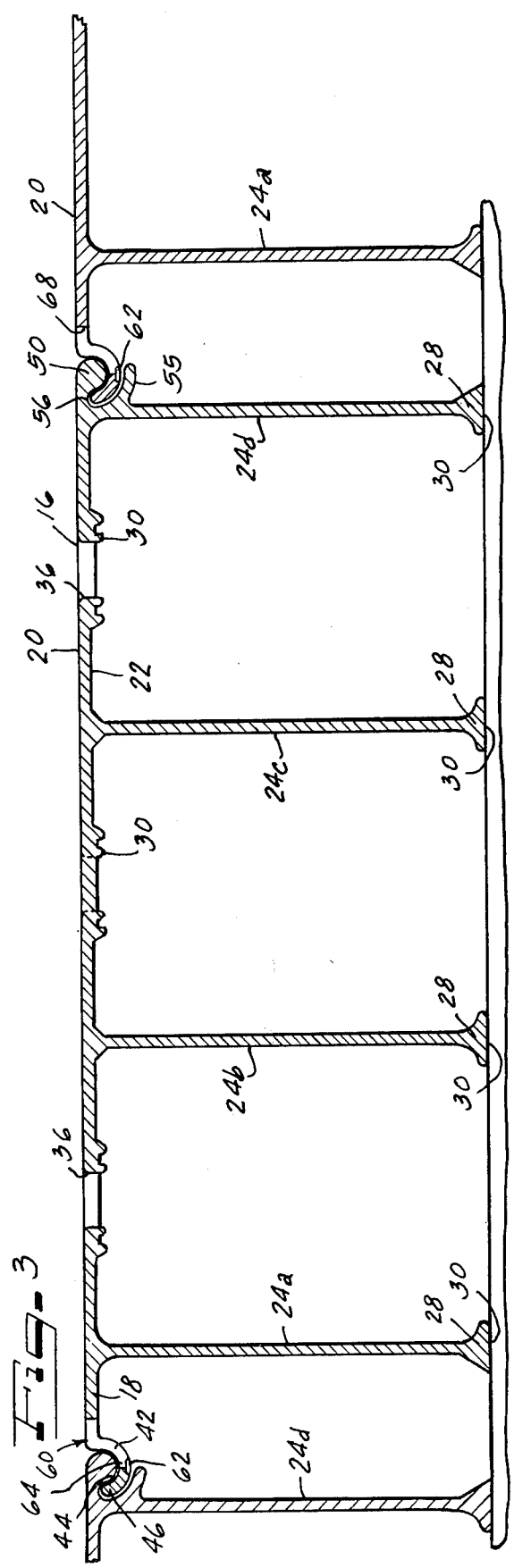

SLOTTED SURFACE FLOORING FOR USE IN ANIMAL HUSBANDRY

BACKGROUND OF THE INVENTION

1. Field of the Invention

This invention relates to flooring structures for use in animal husbandry.

2. Description of the Prior Art

Extruded aluminum floor structures for use in animal husbandry in areas such as farrowing pens, feeder pens, dairy stanchion areas, and other related areas are known. Such constructions normally provide a slotted floor surface spaced above a base floor surface with the slots allowing waste to pass through to an area from which it can be easily flushed. Oftentimes the extruded members are formed with support beams which can be directly rested upon the base floor, while in other installations the support beams will contact ledges or truss members positioned above the base floor only at the longitudinal ends of the extruded member whereby the extruded member bridges the base floor a significant distance thereabove.

Examples of such prior extruded or extrudable flooring systems can be found in U.S. Pat. Nos. 3,837,319, 3,742,911, 3,757,743, 3,722,473 and 3,804,067. While such patents show a number of different constructions, common among them is the provision of a number of inverted U-shaped cross section extruded floor members which are laid up to form a floor, the extruded members being transversely spaced apart from one another to provide longitudinally extending continuous drainage openings. The individual members are then attached together by individual connectors which index with adjacent extruded members or by single connector members which may connect a plurality of extruded members.

Other known flooring devices included plate devices with openings therethrough, see U.S. Pat. No. 3,307,520 and preformed concrete with individual slots, see U.S. Pat. No. 3,905,334.

The large size constructions, such as preformed concrete members and large plates, are extremely cumbersome to install and remove, and extremely expensive to ship. Additionally, in order to avoid abnormal weakening of such constructions, the drainage openings are either small and well spaced from one another, thereby reducing effective drainage, or are formed as continuous gaps between adjacent individual structures. In the latter event, the individual structures will either be very narrow in order to adequately space the openings for proper cleanup in which case an abnormally large number of individual floor units must be put in place, or, if the floor units are of a reasonable width, the openings will be spaced sufficiently far apart so as to reduce the cleanup effectiveness.

Although gratings have been known which provide greater width, and therefore required fewer members, they still require individual unit connectors. See U.S. Pat. No. 3,046,852.

Heretofore, there has been no economical, practical, system utilizing relatively wide longitudinally extending extruded members reducing the number of individual members to be assembled to comprise a floor structure while at the same time providing adequate drainage and ease of attachment and assemblage without reducing necessary strength.

SUMMARY OF THE INVENTION

Our invention provides a slotted floor for animal husbandry constructed of a plurality of longitudinally extending lengths of extruded aluminum forming a horizontal floor surface with depending vertical support beams underlying the floor surface. The floor surface is slotted with a plurality of longitudinally and transversely spaced apart elongated slots. The support beams are multiple in number and are spaced transversely of one another and are aligned with the slots such that a row of longitudinally spaced apart slots is positioned intermediate adjacent support beams. Side wall portions of the horizontal floor extend beyond the outside support beams with one longitudinal side wall having a male connector configuration and the other longitudinal side wall having a female connector configuration indexable with the male connector configuration. Preferably, the longitudinal side forming the male connector configuration is itself slotted partially through that connector configuration whereby when the male connector configuration is mated with a female connector configuration of an adjacent extruded member, a plurality of slots will be provided at that connection.

In order to provide sufficient rigidity to the structure, stiffening ribs are formed on the undersurface of the horizontal flooring paralleling the longitudinal slot rows. Additionally, the bases of the support beams are formed with transversely widened footed areas.

In the preferred embodiment illustrated, the connector configurations involve an arcuate female slot and an arcuate male projecting ear with the slot having a dimension slightly greater than the ear whereby pivoting connection between adjacent extruded members can be obtained without binding or the application of force.

The flooring of our invention is constructed by simple extrusion of the lengths, followed thereafter, by a punch slotting operation which rounds or bevels the slot edges to eliminate any sharpness. In order to prevent sharpness at the slot edges in the area of the male connector, the undersurface of the male connector is extruded with a longitudinally extending groove therein which will align with the walls of the slots punched therethrough.

It is therefore an object of this invention to provide an improved slotted flooring for animal husbandry.

It is another, more particular, object of this invention to provide a slotted flooring for animal husbandry constructed of a plurality of extruded aluminum lengths which are indexable with adjacent lengths by means of integral connector configurations formed as longitudinal side edges of the extruded lengths.

It is another and more particular object of this invention to provide slotted flooring for use in animal husbandry consisting of a plurality of extruded aluminum lengths, each of which is formed with a generally horizontally extending flooring surface and a multiplicity of depending support beams terminating at free ends thereof in increased dimensions footed portions; the flooring surface having a plurality of transversely spaced apart rows of longitudinally spaced apart slots, the slot rows positioned intermediate support beams; side edges of the lengths formed with respectively male and female coupling configurations; and, the flooring surface being provided with stiffening ribs adjacent the slot rows on an undersurface thereof.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

BRIEF DESCRIPTION OF THE DRAWINGS

FIG. 1 is a fragmentary perspective view of a slotted flooring assembly according to this invention, FIG. 2 is a fragmentary perspective end view of the flooring according to this invention, and FIG. 3 is a cross sectional enlarged view of the flooring of this invention.

DESCRIPTION OF THE PREFERRED EMBODIMENTS

FIG. 1 shows a fragmentary perspective view of a flooring structure 10 particularly adapted for use in animal husbandry. This structure consists of a plurality of individual lengths 12 of extruded aluminum. The lengths each have a number of rows 14 transversely spaced apart across the width of the lengths, the rows consisting of a multiplicity of individual longitudinally spaced apart slots 16 providing drainage from the upper flooring surface.

As best illustrated in FIG. 2, each of the lengths 12 includes a generally horizontal flooring portion 18 having an upper flooring surface 20, and, as illustrated in FIG. 3, a lower flooring surface 22. Depending from the lower surface 22, i.e. the underside of the horizontal flooring 18, are a plurality of support beams 24a through d. Each of the support beams terminates in an enlarged footed bottom portion 28 having a substantially flat end wall surface 30. The beams extend the longitudinal length of the individual lengths and are preferably four in number for each length, although the number of support beams can be increased if desired, the primary objective is to provide an individual length having a sufficiently large width to reduce the number of individual assemblages necessary for a floor, while, at the same time, not providing such a great width as to make the individual lengths difficult to handle.

Intermediate each of the support beams, the flooring 18 is pierced with a row 14 of longitudinally spaced apart slots 16. By providing only one row between support beams, it is assured that sufficient strength and rigidity will be retained in the structure.

In addition, in order to provide an anti-buckling strength to the horizontal flooring 18, the undersurface 22 is ribbed as at 30 adjacent each slot 16 on both sides of the slot. Preferably the ribbing continues the longitudinal distance of the length and is extruded with the original formation. Since the slots 16 are preferably pierced after extrusion, and preferably by a device which provides rounded edges 36 on the top surface 20, the slots, being in the area of the ribs 30, will not weaken the structure adversely. In addition, as shown, the thickness of the flooring in the slot area is greater than in other areas.

It is to be noted that the slots in adjacent rows are preferably longitudinally staggered from one another thereby again adding to the overall strength of the device.

Each length is provided with an integrally formed connecting configuration. The side edge 40 adjacent the support beam 24a is formed with a transversely projecting arcuate male connector 42. As best shown in FIG. 3, the male connector consists of a U-shaped or arcuate portion 44 which depends from the horizontal flooring portion 18 and which has a free end 46 which terminate slightly below the undersurface 22. This indexes with a female coupling configuration at the side edge 48 adjacent the leg 24d. The female coupling connection consists of a rounded bead 50 forming the longitudinally extending outside edge of the individual length 12. A projecting ear or lip 55 extends outwardly from the side vertically spaced below the bead 50 defining an arcuate groove 56 therebetween. The arcuate groove is dimensioned with respect to the male member 40 so that the male member can be received within the groove in a clearance relationship allowing easy pivotable insertion of the male member into the groove. However the curve of the male member and the radius of the bead are such as to prevent lateral movement of the connected lengths once they are assembled together except for a very minor lateral movement allowed by the clearance.

In order to provide drainage between the leg 24a of one length and the leg 24d of an attached adjacent length, a row 60 of slots 16 is formed adjacent to and as part of the projection 40.

When extruded, the projection 40 has a groove 62 formed in an undersurface thereof which is alignable with a side wall 64 of the slots of the row 60 so as to eliminate any sharp corners thereat. The slots of the row 60 then extend from a point 68 on the top surface 20 transversely to the notch 62 leaving an unslotted ear portion extending upwardly into the groove 56. Because the groove 56 and the male projection are substantially equally curved, one link can be attached to an adjacent link by positioning the horizontal floor surface substantially vertically and aligning the male projection with the opening of the groove 56 and the remaining portion of the U extending around towards the top of the bead 50. Thereafter mere pivoting of the vertically disposed link around the bead 50 will cause the two said sections to interlock substantially along the entire link.

It can therefore be seen from the above that our invention provides an improved slotted flooring for animal husbandry wherein the flooring is constructed of a plurality of adjacent lengths of extruded material, each length having a generally planar floor surface with a plurality of support beams projecting from one side of the floor surface substantially normal thereto and terminating in increased dimensioned footed ends. A plurality of longitudinally spaced apart slots are provided through the flooring surface intermediate each of the support beams to provide drainage from the flooring surface to the area between support beams, the underside of the flooring being provided with reinforcing ribs adjacent the slots. One side of each length terminates in an arcuate male connecting member while the other side of each length terminates in a cooperating female arcuately curved coupling member whereby adjacent lengths are attached together through a pivotable interlock. An additional row of longitudinally spaced apart slots are provided at the edge of the flooring surface, preferably along the male connecting configuration side, and this row of slots may be formed partially through the male connecting configuration.

Preferably, the slots in adjacent longitudinal rows are staggered from one another.

In a preferred embodiment, each flooring length is constructed of extruded metal having a thickness of approximate range of 0.070–0.090 inches. The overall width of a length from the outside edge 48 to the edge from which the U-shaped member 44 depends is 8 inches. Four support beams are provided spaced approximately 2 ¼ inches apart. The material of each length in the area of the slots is extruded with a thickness of 0.088 inches as is the curved male projection. The ribs 30 have a height of at least 0.125 inches from the undersurface 22. The innermost ribs are spaced apart approximately 4/10 inch and the outermost ribs are spaced apart approximately 7/10 inch. In such a construction, the groove 56 will have an open dimension of approximately 0.15 inches and is therefore considerably larger than the thickness of 0.88 inches of the male projection which indexes therewith.

For an 8 inch wide length, we have provided support beams of two heights — 1 approximately 3 inches and the other 1 ¼ inches.

The slots are formed with rounded ends and are aligned with the center of the span between adjacent suppoort beams and with the center line of the ribs 30. The slots are spaced apart longitudinally of one another approximately 2 ½ inches and have overall lengths of approximately 5 inches.

We have found that such a construction provides a superior slotted flooring, particularly well adapted for use in hog husbandry, and which is sturdy, easy to assemble, and long lasting.

Although it has been described with respect to preferred embodiments, it is not to be so limited, as changes and modifications may be made which are within the full intended scope as defined by the appended claims.

We claim as our Invention:

1. A flooring structure for use in animal husbandry comprising: a floor assembly constructed of a plurality of individual lengths of extruded material, each of said lengths having a flooring surface with transverse side margins, a top surface and an undersurface, at least three support beams extending normal to said undersurface from said undersurface, said support beams extending longitudinally of the length of said lengths, said support beams terminating in increased dimension footed ends, a plurality of longitudinally spaced apart slots through said flooring surface intermediate adjacent support beams, longitudinally continuous raised stiffening ribs extending the length of said lengths projecting from the undersurface adjacent the slots on either side thereof, one of said side margins having an arcuate male connection configuration portion projecting therefrom, the male portion defining an open top longitudinally extending groove, the other of said side margins having an arcuate female connection portion extending thereinto, the male portion of one length receivable in the female portion of an adjacent length, and said adjacent lengths being transversely coupled together by the indexing of said connecting portions, an additional row of longitudinally spaced apart slots provided at the side edge having the male coupling member with the slots of said additional row of slots formed partially through portions of said male portion projection, including portions of a bottom of the groove, and at least partially formed through adjacent portions of the flooring surface.

2. The flooring of claim 1 wherein the lengths are thickened in theareas of the slots.

3. The flooring of claim 1 wherein the male projection is formed with an arcuate underside, said underside having a projection thickness reducing groove extending longitudinally thereof, the slots of said additional row of slots having one side edge aligned with said groove.

* * * * *